United States Patent Office 2,821,857
Patented Feb. 4, 1958

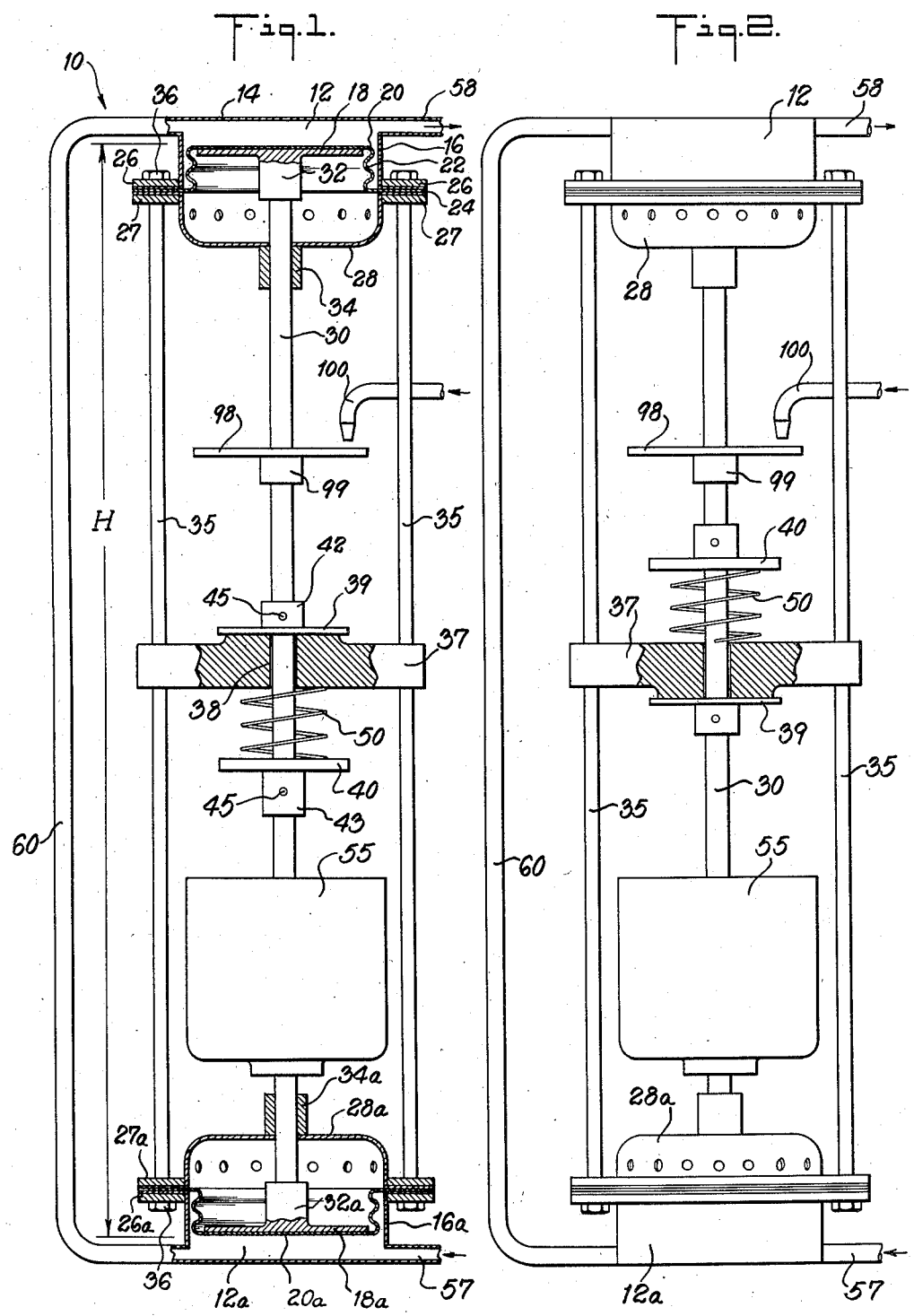

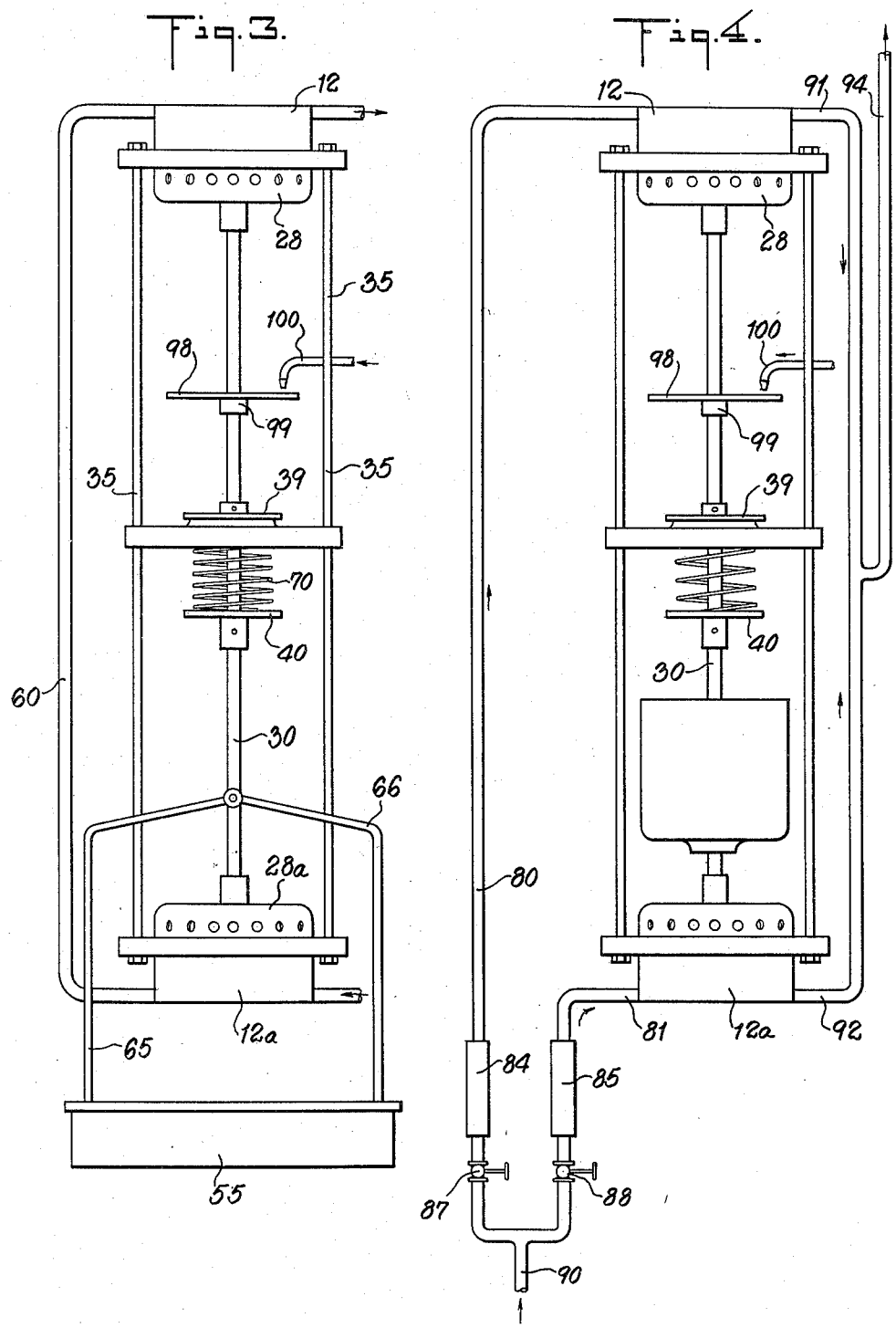

2,821,857

SPECIFIC GRAVITY MEASURING INSTRUMENT

Alexis Georges Basilevsky, Sea Cliff, N. Y., assignor to North American Solvay, Inc., New York, N. Y., a corporation of Delaware Application February 28, 1955, Serial No. 490,959

5 Claims. (Cl. 73—438)

This invention relates to a device for measuring the specific gravity of a liquid and is more particularly concerned with a device of the character indicated which is adapted to measure specific gravity continuously and which is adapted to be associated with a recording instrument for continuously recording the specific gravity values determined.

In many operations involving the handling of liquids, particularly in the chemical industry, it is important, and often essential, to know the specific gravity of a liquid at a given time. Many processes, for example, are controlled by maintaining the specific gravity of a liquid product or raw material within predetermined limits or at a specific predetermined value. For the latter purpose, it is necessary to make specific gravity determinations frequently and proper recording of the specific gravity determinations is necessary for efficient and accurate operation.

In the past, hydrometers have been generally used for specific gravity measurements. While hydrometers have a generally acceptable accuracy, they are elementary measuring instruments that must be read directly by the operator and they are not adapted to be associated with recording apparatus nor can they be practicably used to transmit their readings automatically. Hydrometers, therefore, require the constant personal attention of the operator.

Use has also been made of specific gravity meters which are based upon the measurement of the difference in pressure between two different levels of a gas which is bubbled through the liquid the specific gravity of which is being measured. Such meters, however, have a relatively low accuracy. Further, the bubbling of a gas through the liquid is in many cases not desirable and a relatively large volume of liquid is required. If a change in the specific gravity of the liquid occurs, a time lag occurs before the instrument indicates the change. If there is a change in the temperature of the liquid, the vessel which contains the liquid being measured will expand and, therefore, the distance between the two levels at which the pressure of the gas is measured will change, with the result that the determination will not be fully accurate.

There is, therefore, a need for a specific gravity measuring instrument which is accurate at all times, which will measure the specific gravity of a liquid continuously, which will respond immediately to any change in specific gravity, which is adapted to transmit automatically the specific gravity values determined to a recording device and which at the same time is adapted to actuate other devices in response to changes in the specific gravity values being measured to permit automatic control of a process.

It is the principal object of the present invention to provide a specific gravity measuring instrument which avoids the drawbacks and shortcomings of the devices for measuring specific gravity heretofore known.

It is another object of the invention to provide an instrument of the character indicated which fulfills the above-noted need in the art.

It is a further object of the invention to provide a specific gravity meter of this nature which continuously and accurately measures the specific gravity of a liquid and indicates immediately any changes in the specific gravity of the liquid flowing through it.

It is another object of the invention to provide an accurate, continuous specific gravity measuring instrument which is adapted to be connected with an automatic continuous recording instrument.

It is a still further object of the invention to provide a specific gravity meter which is adapted to operate valves, thermostats or other instruments in response to variations in the specific gravity of the liquid passing through it.

It is another object of the invention to provide an instrument of this nature which is free from complicated moving parts and which is easy to maintain.

In accordance with the invention, I provide a specific gravity measuring instrument which comprises a first pressure chamber provided with means defining a first movable pressure surface, a second pressure chamber provided with means defining a second movable pressure surface, the two pressure surfaces being rigidly interconnected to move in unison, means for supplying the fluid being handled to the first chamber and means for supplying the fluid to the second chamber. The instrument further includes a variable force compensating means, e. g. a spring, and a weight biasing the pressure surfaces in the direction of the lower of said chambers. In one embodiment of the invention described below by way of example, the two chambers are vertically spaced apart and the liquid being measured is caused to flow through the chambers in series, first flowing through the lower second chamber and then flowing through the upper first chamber, and in another embodiment the liquid flows through the instrument in parallel, one stream flowing through the upper chamber while a separate stream simultaneously flows through the lower chamber.

It is a feature of the invention that the instrument continuously and accurately measures the specific gravity of the liquid flowing through it.

It is another feature of the invention that the instrument is not affected by the total pressure of the liquid and, therefore, an accurate measurement of the specific gravity can be made at any point in the liquid line.

It is a further feature of the invention that the instrument is not, from a practical standpoint, influenced in its operation by the temperature of the liquid.

It is another feature of the invention that the instrument is adapted to be constructed of materials which are corrosion resistant.

It is another feature of the invention that the instrument is readily adapted to transmit its measurements to a recording instrument and/or to any other instrument or device to be actuated in response to changes in the specific gravity being measured.

Other objects and features of the invention will be readily apparent from the following detailed description of illustrative embodiments of the invention and from the accompanying drawings, wherein Fig. 1 is a side elevational view, partly in section, of a specific gravity measuring instrument embodying features of the present invention;

Fig. 2 is a similar view of an instrument such as shown in Fig. 1 but arranged for the measurement of the specific gravity of light liquids;

Fig. 3 is a side elevational view of an instrument as shown in Figs. 1 and 2 but constructed for particular use in measuring the specific gravity of heavy liquids; and Fig. 4 is a side elevational view of an instrument of the type shown in Figs. 1 to 3 but showing diagrammatically an arrangement for the parallel flow of liquid through the instrument.

Referring to the drawings, and more particularly to Fig. 1, the reference numeral 10 designates generally the meter illustrated. Meter 10 includes an upper chamber 12 defined by a top wall 14, side walls 16, and a bottom wall 18 which takes the form of a vertically movable plate providing a pressure surface. Fluid-tightness around movable plate 18 is provided by a flexible bellows or diaphragm 20 which extends across plate 18 and has pleated edge portions 22 with peripheral flange portions 24 which are pressed between flanges 26 and 27, suitable packing being provided between the flanges. Flange 26 is secured to side wall 16 and flange 27 is secured to the wall of a casing 28 which provides an air chamber below plate 18, the wall of casing 28 being perforated to permit free flow or air to prevent the building up of air pressure in the casing. Lower chamber 12a is of the same construction as upper chamber 12 and includes a plate 18a, side walls 16a, a diaphragm 20a, flanges 26a and 27a and a casing 28a.

Plates 18 and 18a are interconnected by a rigid rod 30, to establish the pressure surfaces defined by the plates and the diaphragm webs overlying them at a distance H, the plates being provided with hubs 32 and 32a, respectively, in which the ends of rod 30 are received, and sleeves 34 and 34a being provided on casings 28 and 28a, respectively, to guide rod 30. The chambers 12 and 12a are held in fixed spaced-apart relationship by connecting rods 35 which extend through suitable apertures in flanges 26, 27, 26a and 27a and are locked in place by nuts 36. Ordinarily four connecting rods are used. Intermediate chambers 12 and 12a is a bearing plate 37 the purpose of which will be apparent as the description proceeds. Bearing plate 37 is rigidly connected to rods 35 in any convenient manner, as by welding, the rods passing through suitable formed apertures in the plate and plate 37 is formed with a central aperture 38 for slidably receiving rod 30. On each side of bearing plate 37 adjustable stop plates 39 and 40 are mounted on rod 30, the stop plates having hubs 42 and 43, respectively, which receive set screws 45 for securing the plates in position on the rod 30. Interposed between the opposed surfaces of bearing plate 37 and lower stop plate 40 is a spring 50 which biases the movable assembly supported by rod 30 in the direction of lower chamber 12a, upper stop plate 39 serving to limit downward movement of the assembly. Rod 30 is also provided with a weight 55 which is secured to rod 30 in any convenient manner, as by welding. If it is desired to make weight 55 adjustable it may take the form of a cylindrical container open at its upper end into which elements, e. g. bricks, of measured weight may be introduced.

The liquid to be measured in specific gravity meter 10 is introduced into lower chamber 12a through an inlet conduit 57 and leaves upper chamber 12 through an outlet conduit 58, a conduit 60 serving to interconnect chambers 12 and 12a. Conduit 60 is of relatively large internal diameter, e. g. 1 or 2 inch to avoid any appreciable pressure drop over the distance H.

Advantageously, the various parts of meter 10 which come into contact with the liquid being handled are formed of materials which are resistant to corrosion by the liquid. For example the conduits and the chambers are suitably made of rubber-lined steel, steel, plastic, stainless steel, brass, and like material resistant to corrosion by the liquid being handled. Diaphragms 20 and 20a are formed of rubber, a synthetic elastomer, leather, a corrosion resistant flexible metal, e. g. stainless steel, silver and like metals used in the instrument art in making bellows. Rigid rod 30 and movable plates 18 and 18a are suitably formed from invar to minimize the influence of temperature changes.

The force-compensating spring 50 is, of course, a calibrated spring so that the force which it exerts is readily determinable in the desired units. In place of a spring, it will be understood that any other force-compensating means may be used. For example, the spring could be replaced by a lever and weights or by a steel plunger in a reservoir containing mercury. In the latter system the plunger would be fixed to the frame of the instrument and the mercury reservoir would be connected with rigid rod 30.

When instrument 10 is in use, the liquid will enter inlet conduit 57 and it will fill lower chamber 12a, flow through conduit 60, fill upper chamber 12, and flow out through conduit 58. The pressure $P_1$ of the liquid in upper chamber 12 will exert a downward force on the diaphragm rod 30 and the pressure $P_2$ of the liquid in lower chamber 12a will exert an upward force on rod 30. The weight 55 and the compensating means, i. e. the spring 50 will equilibrate all the forces and bring the system to its point of equilibrium. The specific gravity $d$ of the liquid is readily determined in the following manner:

The upward force on rod 30 is $P_2S_2$, $S_2$ being the area of the pressure surface defined by the pressure plate 18a.

The downward force on rod 30 is $P_1S_1$, $S_1$ being the area of the pressure surface defined by pressure plate 18.

The downward force due to the weight of all parts of the movable unit carried by and including rod 30 but excluding weight 55 is $p$.

The downward force due to weight 55 is $W$.

The downward force due to calibrated spring 50 is $F$.

In the position of equilibrium, all of these forces will be balanced, and therefore, $$P_2S_2 = P_1S_1 + p + W + F \tag{1}$$

Now that it is apparent that $P_2 = P_1 + Hd$ and Equation 1 becomes $$P_1S_2 + HdS_2 - P_1S_1 = p + W + F$$

or $$P_1(S_2 - S_1) + HdS_2 = p + W + F \tag{2}$$

with $S_2 = S_1$, $S_2 - S_1 = 0$ and Equation 2 becomes $HdS_2 = p + W + F$ which eliminates the effect of P (3) therefore, $$d = \frac{p + W + F}{HS_2}$$

As shown later, the major dimensions of the apparatus will depend on different factors as specific gravity of the liquid, precision desired, type of liquid, etc.

As an example, in an embodiment for measuring specific gravity of liquids from 1.160 to 1.210 grams per cu. cm. with an accuracy up to 0.0005 grams per cu. cm. in accordance with the invention, the following relationships are suitable:

$H = 100$ cm.
$S_1 = 200$ sq. cm.
$S_2 = 200$ sq. cm.
$p = 8$ kgs.
$W = 14.2$ kgs.
Spring characteristic 200 grams/mm.

When the specific gravity of a light liquid is to be measured, e. g. a liquid having a specific gravity below 0.7 grams/cc., the arrangement shown in Fig. 2 could be employed. As seen in Fig. 2, the instrument is identical with the instrument shown in Fig. 1, and corresponding parts are indicated by the same reference numerals, with the exception that spring 50 is positioned above bearing plate 37 and stop plates 39 and 40 are reversed in position. This arrangement is desirable because of the fact that the downward force exerted by the spring 50 plus the downward force of weight $p$ and $W$ may become too great as compared with the upward force on the rod 30. The spring 50 is, therefore, positioned to exert an upward force on the movable system of the instrument. The measurement of the specific gravity is effected in identical manner as in the instrument of Fig. 1 except that in Formula 1 +F becomes —F.

In measuring the specific gravity of heavy liquids, e. g. liquids having specific gravities above 3 grams/cu. cm., a greater weight W is required and advantageously the weight is mounted in the manner shown in Fig. 3 and a stronger spring is provided. In the construction of Fig. 3 the weight 55 is not mounted as in Figs. 1 and 2 but instead is suspended from arms 65 which in turn are connected to the ends of a beam 66 pivoted at its center in any convenient manner, e. g. by a bolt to rigid rod 30. The spring 70 is identical with spring 50 of Figs. 1 and 2 except that it is adapted to exert a greater force.

As previously mentioned, the conduit 60 is given a sufficiently large internal diameter to avoid any appreciable pressure drop over the distance H. However, if due to local requirements a substantial flow of liquid through the instrument is necessary, then it is desirable to introduce the liquid into the meter in the manner shown in Fig. 4. In the embodiment of Fig. 4 the liquid being handled is passed in parallel through pressure chambers 12 and 12a. For this purpose inlet conduits 80 and 81 are provided, inlet conduits 80 and 81 being provided with flow meters 84 and 85, respectively, and valves 87 and 88, respectively, and the ends of the inlet conduits are joined in a single inlet 90. Similarly, liquid is removed from pressure chambers 12 and 12a through outlet conduits 91 and 92, respectively, which merge into a single outlet line 94. The body of the instrument shown in Fig. 4 is identical with that of the instrument of Fig. 1 but, depending upon the nature of the liquid being handled, the instrument arrangement of Fig. 2 or Fig. 3 may be substituted in Fig. 4.

In a typical practical embodiment of the invention for measuring the specific gravity of light liquids, e. g. for measuring liquids with specific gravity range between 0.600 and 0.650 grams/cu. cm. with a precision up to 0.0005 grams/cu. cm. we may have $H = 100$ cm.
$S_1 = 200$ sq. cm.
$S_2 = 200$ sq. cm.
$p = 8$ kgs.
$W = 6$ kgs.
Spring characteristic 200 grams per mm.

In a typical practical embodiment of the invention for measuring the specific gravity of heavy liquids such as mercury, for instance, if we want to measure the specific gravity between 13.2 and 13.7 grams/cu. cm. with a precision up to 0.005 grams/cu. cm. the following relationships would be suitable.

$H = 500$ cm.
$S_1 = 200$ sq. cm.
$S_2 = 200$ sq. cm.
$p = 10$ kgs.
$W = 110$ kgs.
Spring characteristic 1 kg. per mm.

Determination of suitable relationships for any given liquid and for any practicable accuracy are readily made. For example, the most accurate hydrometers measure specific gravity between two limits, e. g. 1.060 and 1.130, with the smallest subdivision equal to 0.0005. My apparatus can easily accomplish the same result.

Example 1

Let us suppose we want to measure the specific gravity of a liquid between 1.060 and 1.130 with a precision of 0.0005.
Equation 3 becomes $$HS_2(d_2 - d_1) = F_2 - F_1 \quad (4)$$

If H is expressed in cm., $S_2$ in cm.$^2$, d in grams per cm.$^3$, and $F_2$ and $F_1$ in grams, we have $d_2 - d_1 = 0.0005$ grams/cm.$^3$ and if $F_2 - F_1$ is taken to be 50 grams we shall have $HS_2 \times 0.0005 = 50$ and $HS_2 = 10 \times 10^4 = 100.000$ cm.$^3$. If $H = 100$ cm., $S_2 = 1000$ cm.$^2$ of a diameter of 35.7 cm. Between the two extreme specific gravities of 1.060 and 1.130 we shall have $HS_2(1.130 - 1.060) = FM - Fo$, FM being the maximum value of F to be encountered and Fo being the minimum value of M.

$HS_2 \times 0.070 = FM - Fo$
$10^5 \times 7 \times 10^{-2} = FM - Fo$
$7 \times 10^3 = FM - Fo$ or 7,000 grams $= FM - Fo$ Therefore, the sensibility of our spring should be $$\frac{50 \times 100}{7000} = 0.715\%$$

This can be readily provided.

To continue with our example, we can assume that $Fo = 1000$ grams. Therefore, $FM = 8000$ grams.

The smaller specific gravity will give us $HS_2 \times do = p + W + Fo$
$10^5 \times 1.060 = p + W + 1000$
$10^6 \times 10^3 = p + W + 10^3$
$10^5 \times 10^3 = p + W$ grams, or 105 kilograms

Example 2

We may be willing to measure the specific gravity of a liquid between two limits, such as 1.160 and 1.210 e. g. nearly saturated NaCl brine.
Then, $HS_2(1.210 - 1.160) = FM - Fo$
$HS_2\, 0.050 = FM - Fo$ If specific gravity is to be measured with 1% accuracy, that is to say, that the smallest unit will be for specific gravity difference of 0.0005. We shall say that $HS_2 \times 0.0005 = 10$ grams $$HS_2 = \frac{10}{5} \times 10^4 \text{ cm.}^3$$

$HS_2 = 2 \times 10^4$ cm.$^3$ $H = 100 = 10^2$ cm.

$S_2 = 2 \times 10^2$ cm.$^2$

The diameter of the diaphragm, therefore, is to be 16 cm.

$HS_2 \times (1.210 - 1.160) = FM - Fo$
$2 \times 10^4 \times 0.050 = FM - Fo$
$10^3 = FM - Fo$ grams or $FM - Fo = 1$ kilogram We can assume that $Fo = 1$ kilogram and $FM = 2$ kilograms and therefore, if we have $F = KY$, wherein
$F =$ force of the spring in grams
$Y =$ displacement of the spring in mm.

and $K =$ spring constant in grams per mm.

and we want the total displacement to be 5 mm., therefore, the characteristics of the spring will be $FM - Fo = 1000$ grams $= K(YM - Yo)$
1000 grams $= K \times 5$ mm.
$K = 200$ grams/mm.

For such an instrument $HS_2 \times 1.160 = p + W + Fo$
$2 \times 10^4 \times 1.160 = p + W + 10^3$
$23.2 \times 10^3 = p + W + 10^3$
$22.2 \times 10^3 = p + W$ and $p + W = 22.2$ kg.

Example 3

If we want to measure the specific gravity of a liquid with a specific gravity varying between 1.500 and 1.550 (50% NaOH lye), we shall have exactly the same equations as for Example 2.

$$HS_2(0.050) = FM - Fo$$
$$HS_2 = 2 \times 10^4 \text{ cm.}^3$$
$$FM - Fo = 1 \text{ kilogram}$$
$$HS_2 \times 1.500 = p + W_3 + Fo$$
$$Fo = 1 \text{ kilogram} = 10^3 \text{ grams}$$
$$2 \times 10^4 \times 1.500 = p + W_3 + 10^3$$
$$3 \times 10^4 = p + W_3 + 10^3$$
$$29 \times 10^3 = p + W_3$$

In Example 2 we found $$22.2 \times 10^3 = p + W_2$$

The weight of the equipment will be the same and the difference, therefore, will be $$W_3 - W_2 = 6.8 \times 10^3 \text{ grams}$$

or 6.8 kilograms.

Therefore, an apparatus adjusted to measure the specific gravity of a liquid between two given values could be adjusted to measure with the same accuracy any other specific gravity, provided the additional weights ($W_3 - W_2$) are provided.

Let us suppose that we want to measure the specific gravity of a very light liquid between the limits of 0.600 and 0.650 grams per cu. cm., and that we want to measure it with a precision of 0.0005 grams/cu. cm., using the arrangement of Fig. 2.

In that case, we shall have as before:

$$HS_2 \; 0.005 = 10 \text{ grams}$$
$$HS_2 = 2 \times 10^4 \text{ cu. cm.}$$

Then $HS_2 \times 0.050 = 1000$ grams and, therefore, 1000 grams $= Fo - FM$.

If we assume $FM = 1000$ grams and $Fo = 2000$ grams then $$HS_2 \; 0.600 = p + W - 2000$$
$$2 \times 10^4 \times 0.600 = p + W - 2000$$

or $$p + W = 14{,}000 \text{ grams} = 14 \text{ kgs.}$$

There is thus provided an accurate, fool-proof instrument for continuously measuring the specific gravity of liquids over any predetermined range of specific gravity values. As above indicated, one of the important advantages of the above described instrument, is the fact that it is of a construction which is adapted to indicate the values which it measures in any convenient manner and to transmit these values to recording means or to actuate other devices such as valves, thermostats, etc. to control an operation in response to changes in the specific gravity values which it continuously and accurately measures. The indication and/or transmission of the values determined is effected by employing the displacement of the rigid connection between the diaphragms of the pressure chambers 12 and 12a, i. e. the rigid rod 30. Indication and/or transmission of the movements of the rod 30 may be effected in any convenient manner. Indication of values may be effected by means of a pointer movable in response to the movements of the rigid rod and calibrated scales. Transmission of the values may be effected, for example, by means of a system of levers or by the variations in the pressure of air issuing from a nozzle, for example as described on pp. 1320-1 of Perry's Chemical Engineers' Handbook, Third Edit. The latter arrangement is shown in Figs. 1 to 4, which show a plate 98 mounted on rod 30 by means of a hub 99 and an air nozzle 100 directing the stream of air issuing from it to the surface of plate 98. The variations in air pressure resulting from the movements of rod 30 and, therefore, the movements of plate 98, are readily recorded and can be read in terms of specific gravity values. At the same time, these variations in air pressure can be utilized to actuate valves, thermostats, or the like, when they reach predetermined values.

The above described specific gravity meter finds practical application in the chemical industry wherein it is suitably used in connection with the dissolution of a soluble salt in a solvent to arrive at a predetermined concentration which, of course, corresponds to a predetermined specific gravity value determinable by the instrument, the blending of two liquids to a predetermined specific gravity value, the checking of the quality of a product by its specific gravity, and the automatic control of a process by variations in the specific gravity of the product produced.

It will be apparent to those skilled in the art that various changes and modifications in the embodiments described above, and illustrated in the drawing may be made without departing from the scope of the invention as defined in the appended claims, and it will be understood that, insofar as they are not mutually incompatible, the various features and details of construction of the several embodiments shown and described are interchangeable with one another. It is intended, therefore, that all matter contained in the foregoing description and in the drawings, shall be interpreted as illustrative only and not as limitative of the invention.

What I claim and desire to secure by Letters Patent is:

1. A device for measuring the specific gravity of a flowing liquid and for instantaneously detecting small changes in the specific gravity of said liquid which comprises, in combination, means defining an upper pressure chamber provided with means defining an upper movable pressure surface, means defining a lower pressure chamber provided with means defining a lower movable pressure surface, connecting means rigidly interconnecting said upper pressure surface and said lower pressure surface to move in unison, means for continuously supplying the liquid to be measured directly into the lower chamber for direct action of said liquid upon said lower pressure surface and means for continuously supplying said liquid directly into the upper chamber for direct action of said liquid upon said upper pressure surface, means for providing a constant head of liquid between the two pressure chambers, and means for continuously removing the liquid from said chambers, whereby a continuous flow of said liquid may be effected through said chambers simultaneously and said liquid being measured may continuously exert a direct action simultaneously upon both of said pressure surfaces as said liquid flows through the two pressure chambers, a variable force compensating means acting upon said connecting means, and a weight biasing the pressure surfaces in the direction of said lower chamber.

2. A device for measuring the specific gravity of a flowing liquid and for instantaneously detecting small changes in the specific gravity of said liquid which comprises, in combination, means defining an upper pressure chamber provided with means defining an upper movable pressure surface, means defining a lower pressure chamber provided with means defining a lower movable pressure surface, connecting means rigidly interconnecting said upper pressure surface and said lower pressure surface to move in unison, means for continuously supplying the liquid to be measured directly into the lower chamber for direct action of said liquid upon said lower pressure surface and means for continuously supplying said liquid directly from the lower chamber into the upper chamber for direct action of said liquid upon said upper pressure surface, means for providing a constant head of liquid between the two pressure chambers, and means for continuously removing the liquid from said chambers, whereby a continuous flow of said liquid may be effected through said chambers simultaneously and said liquid being measured may continuously exert a direct action simultaneously upon both of said pressure surfaces as said liquid flows through the two pressure chambers, a variable force compensating means acting upon said connecting means, and a weight biasing the pressure surfaces in the direction of said lower chamber.

3. A device for measuring the specific gravity of a flowing liquid and for instantaneously detecting small changes in the specific gravity of said liquid which comprises, in combination, means defining an upper pressure chamber provided with means defining an upper movable pressure surface, means defining a lower pressure chamber provided with means defining a lower movable pressure surface, connecting means rigidly interconnecting said upper pressure surface and said lower pressure surface to move in unison, means for continuously and simultaneously supplying the liquid to be measured directly into the lower chamber for direct action of said liquid upon said lower pressure surface and means for continuously supplying said liquid directly into the upper chamber for direct action of said liquid upon said upper pressure surface, means for providing a constant head of liquid between the two pressure chambers, and means for continuously removing the liquid from said chambers, whereby a continuous flow of said liquid may be effected through said chambers simultaneously and said liquid being measured may continuously exert a direct action simultaneously upon both of said pressure surfaces as said liquid flows through the two pressure chambers, a variable force compensating means acting upon said connecting means, and a weight biasing the pressure surfaces in the direction of said lower chamber.

4. A device for measuring the specific gravity of a flowing liquid and for instantaneously detecting small changes in the specific gravity of said liquid which comprises, in combination, means defining an upper pressure chamber provided with an upper plate defining an upper movable pressure surface, means defining a lower pressure chamber provided with a lower plate defining a lower movable pressure surface, diaphragms overlying said plates and providing fluid tightness for said plates in said chambers, connecting means rigidly interconnecting said upper pressure surface and said lower pressure surface to move in unison, means for continuously supplying the liquid to be measured directly into the lower chamber for direct action of said liquid upon said lower pressure surface and means for continuously supplying said liquid directly into the upper chamber for direct action of said liquid upon said upper pressure surface, means for providing a constant head of liquid between the two pressure chambers, and means for continuously removing the liquid from said chambers, whereby a continuous flow of said liquid may be effected through said chambers simultaneously and said liquid being measured may continuously exert a direct action simultaneously upon both of said pressure surfaces as said liquid flows through the two pressure chambers, a variable force compensating means acting upon said connecting means, and a weight biasing the pressure surfaces in the direction of said lower chamber.

5. A device for measuring the specific gravity of a flowing liquid and for instantaneously detecting small changes in the specific gravity of said liquid which comprises, in combination, means defining an upper pressure chamber provided with an upper plate defining an upper movable pressure surface, means defining a lower pressure chamber provided with a lower plate defining a lower movable pressure surface, diaphragms overlying said plates and providing fluid tightness for said plates in said chambers, rod means rigidly interconnecting said upper pressure surface and said lower pressure surface to move in unison, means for continuously supplying the liquid to be measured directly into the lower chamber for direct action of said liquid upon said lower pressure surface and means for continuously supplying said liquid directly into the upper chamber for direct action of said liquid upon said upper pressure surface, means for providing a constant head of liquid between the two pressure chambers, and means for continuously removing the liquid from said chambers, whereby a continuous flow of said liquid may be effected through said chambers simultaneously and said liquid being measured may continuously exert a direct action simultaneously upon both of said pressure surfaces as said liquid flows through the two pressure chambers, a calibrated spring means acting upon said rod means, a weight biasing the pressure surfaces in the direction of said lower chamber, and means for measuring the displacement of said connecting means.

References Cited in the file of this patent

UNITED STATES PATENTS

| | | |
|---|---|---|
| 1,739,297 | Eynon | Dec. 10, 1929 |
| 2,115,520 | Decker | Apr. 26, 1938 |
| 2,434,098 | Bays | Jan. 6, 1948 |
| 2,603,973 | Wallace | July 22, 1952 |
| 2,623,390 | Speckmann | Dec. 30, 1952 |